Feb. 25, 1936.  K. A. M. REICHE  2,032,329
MOLD
Filed June 29, 1935
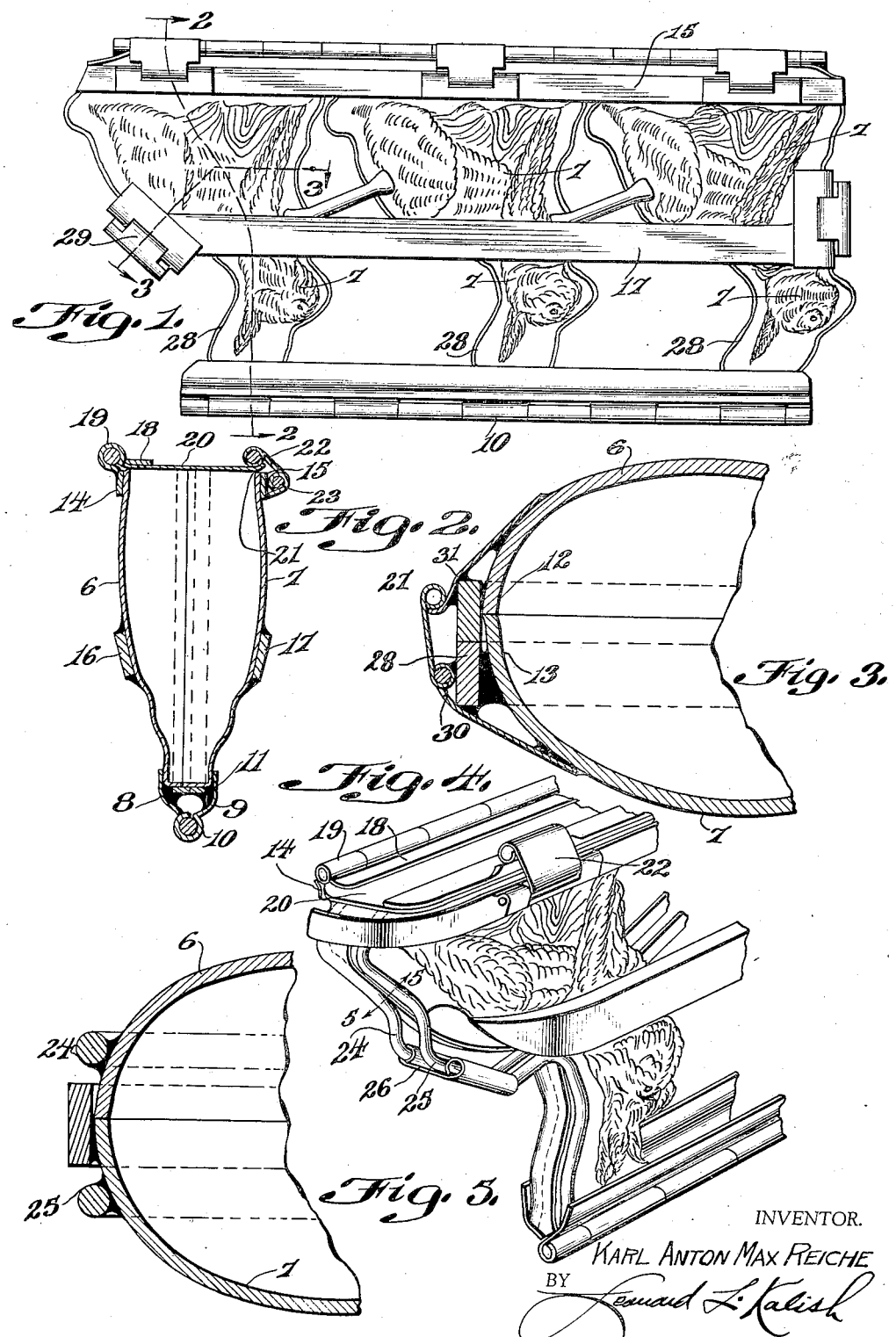
INVENTOR.
KARL ANTON MAX REICHE
BY
Leonard L. Kalish
ATTORNEY.

Patented Feb. 25, 1936

2,032,329

UNITED STATES PATENT OFFICE 2,032,329

MOLD

Karl Anton Max Reiche, Dresden, Germany, assignor to T. C. Weygandt Company, New York, N. Y., a corporation of New York Application June 29, 1935, Serial No. 29,062

2 Claims. (Cl. 107—19)

The present invention relates to certain new and useful improvements in molds, particularly chocolate molds for making hollow chocolate figures.

The present invention relates more particularly to chocolate molds of the general type disclosed in United States Patents Nos. 1,780,091 and 1,948,146, wherein one or a series of similar separable molds are formed of generally similar halves hingedly related to each other, and having a hinged bottom wherein the juxtaposed mold sections meet edge-to-edge when in a closed position, but wherein certain further novel features of construction are present whereby the leakage of chocolate is minimized and whereby the finished chocolate piece is kept better trimmed and freer of "fins" at the parting line.

Referring to the drawing in which like reference characters indicate like parts:

Figure 1 represents a side elevational view of a mold embodying the present invention.

Figure 2 represents a section on line 2—2 of Figure 1.

Figure 3 represents a fragmentary section on line 3—3 of Figure 1 on a much enlarged scale.

Figure 4 represents a perspective view of one end of the mold, of a somewhat modified form.

Figure 5 represents a section on line 5—5 of Figure 4.

According to the present invention, one or more pairs of juxtaposed mold sections 6 and 7 of any desired configuration, are fastened at their narrow ends or at their small ends to the opposite wings 8 and 9 of a generally elongated hinge 10 by means of solder 11 or the like, so that the edges 12 and 13 thereof will generally contact and abut each other throughout the circumference of the mold, as indicated particularly in Figures 3 and 5;—that is, excepting only the bottom edges of the mold sections 6 and 7. The hinge-leaf 14 and the strip 15 are soldered to the basal portions of the juxtaposed sections 6 and 7 to keep the same firmly in alignment, while the strips 16 and 17 may be soldered to the intermediate portions to give further security to the mold sections and to unite the series of mold halves into a more or less rigid structure, so that the juxtaposed halves of the entire series may be folded towards and away from each other in unison with their edges 12 and 13 meeting accurately in abutting relation throughout the entire series of molds in one frame.

The other leaf 18 of the hinge 19 is soldered to a lid 20 which forms the bottom of the molded pieces. The plate 20 has a slightly up-turned free longitudinal edge 21 which is adapted to interlock with the more or less resilient hinged clasps 22 pivoted at 23 to the strip 15, thereby holding the plate 20 in closed position and also retaining the mold section in closed position in relation to each other. Terminal wire frames 24 and 25 are soldered to the terminal mold sections 6 and 7 at either end (in the modification indicated particularly in Figure 4) and a more or less resilient clasp 26 is hinged to one of the wires and is adapted detachably to interlock with the other wire as indicated particularly in Figure 4, thereby further to secure the mold sections in closed position when filled and while the chocolate piece is being formed.

In the modification shown in Figures 1, 2, and 3, similar more or less resilient clasps 29 are hingedly secured to the terminal sections as at 30 and engage members 31 secured to the other opposite terminal mold sections.

To the abutting edges of one of the mold sections, as for instance, the mold section 6, a flat sealing strip 27 is soldered;—said strip 27 conforming throughout to the contour of the mold section and substantially overlapping the marginal zone of the juxtaposed mold section 7 when the mold is in closed position as indicated in Figures 3 and 5. In Figure 5, the strip 27 is shown fastened to the mold section 7. By this means, any tendency to leak is eliminated because a double seal is effected at the juncture of the juxtaposed mold sections and further because the strip 17 prevents injury to the abutting edges of the mold sections while the mold sections are being handled and while the mold sections are being manipulated during the formation or solidification of the chocolate pieces.

In the modification shown in Figure 3, another similar strip 28 is soldered to the juxtaposed mold section, as for instance, to the mold section 7 (Figure 3) so that when the mold sections are in their closed position, the strip 28 will also abut the strip 27 and form a secondary seal.

It will be noted that the strips 27 as well as the strips 28 conform to the outline of the mold sections and are of relatively small transverse dimension, that is, their dimension parallel to the parting plane of the molds is relatively small compared to their dimension transversely of the parting plane of the molds. By this means, the heat transfer and dissipation of heat is not seriously interfered with or altered, so that the solidification of the chocolate is not varied or interfered with during the molding operation.

Thus, notwithstanding the provision of the strips 27 and strips 28, the accessibility of air to the mold is maintained substantially undiminished, whereas with relatively wide flanges, that is, with flanges having substantially greater dimension parallel to the parting plane, the access of the air to the sides of the mold sections, that is, to the marginal zones of the mold sections, is greatly diminished with the result that the mold pieces do not cool uniformly but tend to cool unequally and with a greater percentage of damage or injury to the molded products.

The molds of the present invention are adapted for use in combination with apparatus of United States Patent No. 1,576,149 dated March 9th, 1926.

It should be noted that Figures 3 and 5 are much enlarged and the actual thickness of the side walls of the mold sections 6 and 7 are much less than that indicated in these figures, as these figures represent an enlargement of three or four times the actual size (more or less).

The mold construction of the present invention further increases the efficieency of the mold in operation by permitting a quicker and more uniform heating of the molds after each discharge of mold pieces. Thus, after the chocolate has been cooled in the molds and the molded chocolate pieces thus set or solidified, and after the thus formed chocolate pieces have been removed from the molds, the molds must again be heated to a temperature at which the liquid chocolate may be received into the molds again. This re-heating of the molds after each operation is facilitated by the absence of any heavy metallic fins or heavy metallic flanges or mold sections, which make for uneven and which at best require longer or more protracted heating to attain the desired temperature. By virtue of the fact that the sealing strips 27 and 28 are comparatively thin (being possibly but slightly thicker than the comparatively thin wall of the body of the mold sections) both the initial heating of the molds and the subsequent cooling of the molds during the "setting" of the chocolate is facilitated and made more even and more economical and the quality of the resultant product is improved.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A mold for melted chocolate comprising a pair of relatively thin sheet-metal mold sections hingedly secured to each other and having their edges in generally abutting relation to each other when the mold is closed, and a relatively thin sealing strip, distinct from the sheet-metal of the mold sections, secured to and extending around the marginal zone of one of the sections at said edge thereof, overlapping said edge and adapted, when the mold is closed, to overlap said edge of the other section.

2. A mold for melted chocolate comprising a pair of relatively thin sheet-metal mold sections hingedly secured to each other and having their edges in generally abutting relation to each other when the mold is closed, a relatively thin primary sealing strip, distinct from the sheet-metal of the mold sections, secured to and extending around the marginal zone of one of the sections at said edge thereof, overlapping said edge and adapted, when the mold is closed, to overlap said edge of the other section, and a relatively thin secondary sealing strip secured to said other section adapted to abut and form a secondary seal with the primary sealing strip when the mold is closed.

KARL ANTON MAX REICHE.